United States Patent
Mildh et al.

(10) Patent No.: US 11,470,661 B2
(45) Date of Patent: Oct. 11, 2022

(54) BACKHAUL CHANNEL MANAGEMENT FOR IAB NETWORKS

(71) Applicant: Telefonaktiebolaget LM Ericsson (publ), Stockholm (SE)

(72) Inventors: Gunnar Mildh, Sollentuna (SE); Oumer Teyeb, Montréal (CA); Ajmal Muhammad, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/598,739

(22) PCT Filed: Mar. 27, 2020

(86) PCT No.: PCT/IB2020/052930
§ 371 (c)(1),
(2) Date: Sep. 27, 2021

(87) PCT Pub. No.: WO2020/194259
PCT Pub. Date: Oct. 1, 2020

(65) Prior Publication Data
US 2022/0095397 A1 Mar. 24, 2022

Related U.S. Application Data

(60) Provisional application No. 62/825,495, filed on Mar. 28, 2019.

(51) Int. Cl.
*H04W 76/12* (2018.01)
*H04W 92/20* (2009.01)
*H04W 88/08* (2009.01)

(52) U.S. Cl.
CPC ......... *H04W 76/12* (2018.02); *H04W 88/085* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2019/0059027 A1* | 2/2019 | Yang | H04W 36/0083 |
| 2019/0069333 A1* | 2/2019 | Kim | H04W 76/27 |
| 2020/0112885 A1* | 4/2020 | Jin | H04W 36/023 |
| 2020/0146083 A1* | 5/2020 | Wang | H04W 28/16 |
| 2020/0351854 A1* | 11/2020 | Wang | H04W 76/12 |
| 2021/0377805 A1* | 12/2021 | Liu | H04W 72/0413 |

OTHER PUBLICATIONS

International Search Report and Written Opinion issued in International Application No. PCT/IB2020/052930 dated Jun. 9, 2020 (15 pages).

(Continued)

*Primary Examiner* — Saba Tsegaye
(74) *Attorney, Agent, or Firm* — Rothwell, Figg, Ernst & Manbeck, P.C.

(57) ABSTRACT

A method for establishing a BH RLC channel between a node and a DU. The method includes a CU detecting (s402) a need to establish the BH RLC channel between the node and the DU; and in response to detecting the need to establish the BH RLC channel, the CU sending (s404) to the DU an AP message requesting the DU to setup the BH RLC channel. The AP message comprises: i) a list identifying one or more BH RLC channels to be setup, wherein the list comprises at least one item containing a BH RLC Channel identifier, ID, information element, IE, containing a BH RLC Channel ID identifying the BH RLC channel, or ii) a DRB ID IE containing the BH RLC Channel ID identifying the BH RLC channel.

21 Claims, 7 Drawing Sheets

(56) References Cited

OTHER PUBLICATIONS

Ericsson, "Backhaul Channel Setup and Modification Procedure for IAB Networks", 3GPP TSG RAN WG3 Meeting #103, R3-190356, Athens, Greece, Feb. 15, 2019 (4 pages)
Zte et al., "Discussion on BH RLC channel configuration in IAB network", 3GPP TSG RAN WG3 Meeting #103, R3-190546, Athens, Greece, Feb. 15, 2019 (4 pages).
Ericsson, "F1AP Stage-3 Aspects of IAB BH RLC Channel Management, 3GPP TSG RAN WG3 Meeting #103bis", R3-191362, Xi'an, P.R. China, Mar. 29, 2019 (4 pages).
Ericsson, "Backhaul Channel Setup and Modification Procedure for IAB Networks, 3GPP TSG RAN WG2 Meeting #105bis", R2-1903970, Xi'an, P.R. China, Mar. 28, 2019 (5 pages).
Qualcomm, "New WID: Integrated Access and Backhual for NR", 3GPP TSG RAN Meeting #82, RP-182882 (Revision of RP-182810), Sorrento, Italy, Dec. 10-13, 2018 (7 pages)
3GPP TS 38.473 V15.4.1 (Jan. 2019), 3rd Generation Partnership Project; Technical Specification Group Radio Access Network; NG-RAN; F1 application protocol (F1AP) (Release 15), Jan. 2019 (192 pages).
3GPP TR 38.874 V16.0.0 (Dec. 2018), 3rd Generation Partnership Project; Technical Specification Group Radio Access Network; NR; Study on Integrated Access and Backhaul; (Release 16), Dec. 2018 (111 pages).
IPRP issued in International Application No. PCT/IB2020/052930 dated Mar. 28, 2019 (17 pages).

\* cited by examiner

BACKHAUL CHANNEL MANAGEMENT FOR IAB NETWORKS

CROSS REFERENCE TO RELATED APPLICATIONS

This application is a 35 U.S.C. § 371 National Stage of International Patent Application No. PCT/IB2020/052930, filed Mar. 27, 2020, which claims priority to U.S. provisional patent application No. 62/825,495, filed on Mar. 28, 2019. The above identified applications are incorporated by this reference.

TECHNICAL FIELD

Disclosed are embodiments related to backhaul channel management for integrated access and wireless access backhaul (IAB) networks.

BACKGROUND

I. Integrated Access Backhaul Networks

The 3rd Generation Partnership Project (3GPP) is currently standardizing integrated access and wireless access backhaul (IAB) in New Radio (NR) in 3GPP Rel-16 (RP-182882).

The usage of short range mmWave spectrum in NR creates a need for densified deployment with multi-hop backhauling. However, optical fiber to every base station will be too costly and sometimes not even possible (e.g. historical sites). The main IAB principle is the use of wireless links for the backhaul (instead of fiber) to enable flexible and very dense deployment of cells without the need for densifying the transport network. Use case scenarios for IAB can include coverage extension, deployment of massive number of small cells and fixed wireless access (FWA) (e.g. to residential/office buildings). The larger bandwidth available for NR in mmWave spectrum provides opportunity for self-backhauling, without limiting the spectrum to be used for the access links. On top of that, the inherent multi-beam and MIMO support in NR reduces cross-link interference between backhaul and access links allowing higher densification.

During the study item phase of the IAB work (summary of the study item can be found in the 3GPP technical report (TR) 38.874 V16.0.0) it has been agreed to adopt a solution that leverages the Central Unit (CU)/Distributed Unit (DU) split architecture of NR, where the IAB node will be hosting a DU part that is controlled by a CU. A CU is a node that includes base station (e.g., gNB) functions like transfer of user data, mobility control, radio access network sharing, positioning, session management etc., except those functions allocated exclusively to the DU. CU controls the operation of DUs over front-haul (Fs) interface. A DU is a node that includes a subset of the gNB functions, depending on the functional split option. Its operation is controlled by the CU. A CU and a DU are sometimes referred to as a gNB-CU and a gNB-DU, respectively. The IAB nodes also have a Mobile Termination (MT) part that they use to communicate with their parent nodes.

The specifications for IAB strive to reuse existing functions and interfaces defined in NR. In particular, MT, gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The Mobile-Termination (MT) function has been defined as a component of the IAB node. MT is referred to as a function residing on an IAB-node that terminates the radio interface layers of the backhaul Uu interface toward the IAB-donor or other IAB-nodes.

FIG. 1 shows a reference diagram for IAB in standalone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

The baseline user plane and control plane protocol stacks for IAB are shown in FIG. 2 and FIG. 3.

As shown in FIG. 2 and FIG. 3, the chosen protocol stacks reuse the current CU-DU split specification in release 15 (rel-15), where the full user plane F1-U (GTP-U/UDP/IP) is terminated at the IAB node (like a normal DU) and the full control plane F1-C (F1AP/SCTP/IP) is also terminated at the IAB node (like a normal DU). In the above cases, Network Domain Security (NDS) has been employed to protect both UP and CP traffic (IPsec in the case of UP, and DTLS in the case of CP). IPsec could also be used for the CP protection instead of DTLS (in this case no DTLS layer would be used).

A new layer, called adaptation layer (the final name of this layer to be used in the standard is still pending), has been introduced in the IAB nodes and the IAB donor, which is used for routing of packets to the appropriate downstream/upstream node and also mapping the UE bearer data to the proper backhaul RLC channel (and also between ingress and egress backhaul RLC channels in intermediate IAB nodes) to satisfy the end to end QoS requirements of bearers.

II. Bearer Configuration Aspects of CU/DU Split Architecture

In a CU/DU split architecture, the bearer setup/modification is handled via the F1 UE context setup and F1 UE context modification procedures between the CU and DU. The different information elements (IEs) relevant to DRB/SRB setup/modification are:

1. DRB/SRB to setup Lists (in UE Context Setup Request, UE Context Modification Request) (list of DRB/SRB that are to be setup, only from CU to DU);

2. DRB setup Lists (in UE Context Setup Response, UE Context Modification Response) (list of DRBs successfully setup, only from DU to CU);

3. DRB/SRB Failed to be Setup Lists (in UE Context Setup Response, UE Context Modification Response) (list of DRB/SRBs that can't be setup, from DU to CU);

4. DRB to be modified Lists (in UE Context Modification Request) (list of DRBs to be modified, from CU to DU):

5. DRB Required to Be Modified List (in UE Context Modification Required) (list of DRBs to be modified, from DU to CU);

6. DRB modified Lists (in UE Context Modification Response, UE Context Modification Confirm) (DRBs that were modified, from CU to DU or DU to CU);

7. DRB Failed to be modified List (in UE Context Modification Response) (DRBs that were not modified successfully, from DU to CU); and 8. DRB/SRB to be released List (in UE Context Modification Request, UE Context Modification Required) (DRBs/SRBs to be released, from CU to DU, or DU to CU).

IEs 1-3 are related to bearer setup, IEs 4-7 are related to bearer modification; and IE 8 is related to bearer release.

The IEs 1-4 mentioned above are shown in the tables below, which information can also be found in 3GPP TS 38.473 V15.4.1 ("TS 38.473").

TABLE 1

(DRB/SRB to be Setup List IE)

| | | | | | |
|---|---|---|---|---|---|
| DRB to Be Setup List | | 0 . . . 1 | | YES | reject |
| >DRB to Be Setup Item IEs | | 1 . . . <maxnoofDRBs> | | EACH | reject |
| >>DRB ID | M | | 9.3.1.8 | — | |
| >>CHOICE QoS Information | M | | | — | |
| >>>E-UTRAN QoS | M | | 9.3.1.19 | Shall be used for EN-DC case to convey E-RAB Level QoS Parameters | — |
| >>>DRB Information | | 1 | | Shall be used for NG-RAN cases | YES ignore |
| >>>>DRB QoS | M | | 9.3.1.45 | — | |
| >>>>S-NSSAI | M | | 9.3.1.38 | — | |
| >>>>Notification Control | O | | 9.3.1.56 | — | |
| >>>>Flows Mapped to DRB Item | | 1 . . . <maxnoofQoSFlows> | | — | |
| >>>>>QoS Flow Identifier | M | | 9.3.1.63 | — | |
| >>>>>QoS Flow Level QoS Parameters | M | | 9.3.1.45 | — | |
| >>>>>QoS Flow Mapping Indication | O | | 9.3.1.72 | — | YES ignore |
| >>UL UP TNL Information to be setup List | | 1 | | — | |
| >>> UL UP TNL Information to Be Setup Item IEs | | 1 . . . <maxnoofULUPTNLInformation> | | — | |
| >>>>UL UP TNL Information | M | | UP Transport Layer Information 9.3.2.1 | gNB-CU endpoint of the F1 transport bearer. For delivery of UL PDUs. | — |
| >> RLC Mode | M | | 9.3.1.27 | — | |
| >> UL Configuration | O | | UL Configuraiton 9.3.1.31 | Information about UL usage in gNB-DU. | — |
| >>Duplication Activation | O | | 9.3.1.36 | Information on the initial state of CA based UL PDCP duplication | — |

TABLE 1-continued

| (DRB/SRB to be Setup List IE) | | | | | | |
|---|---|---|---|---|---|---|
| >> DC Based Duplication Configured | O | | ENUMERATED (true, . . . , false) | Indication on whether DC based PDCP duplication is configured or not. If included, it should be set to true. | YES | reject |
| >>DC Based Duplication Activation | O | | Duplication Activation 9.3.1.36 | Information on the initial state of DC basedUL PDCP duplication | YES | reject |
| >>DL PDCP SN length | M | | ENUMERATED (12 bits, 18 bits, . . .) | | YES | ignore |
| >>UL PDCP SN length | O | | ENUMERATED (12 bits, 18 bits, . . .) | | YES | ignore |
| SRB to Be Setup List | | 0 . . . 1 | | | YES | reject |
| >SRB to Be Setup Item IEs | | 1 . . . <maxnoofSRBs> | | | EACH | reject |
| >>SRB ID | M | | 9.3.1.7 | | — | |
| >>Duplication Indication | O | | ENUMERATED (true, . . . , false) | If included, it should be set to true. | YES | ignore |

TABLE 2

| (DRB Setup List IE) | | | | | | |
|---|---|---|---|---|---|---|
| DRB Setup List | | 0 . . . 1 | | The List of DRBs which are successfully established. | YES | ignore |
| >DRB Setup Item list | | 1 . . . <maxnoofDRBs> | | | EACH | ignore |
| >>DRB ID | M | | 9.3.1.8 | — | | |
| >>LCID | O | | 9.3.1.35 | LCID for the primary path if PDCP duplication is applied | — | |
| >>DL UP TNL Information to be setup List | | 1 | | | — | |
| >>> DL UP TNL Information to Be Setup Item IEs | | 1 . . . <maxnoofDLUPTNLInformation> | | | — | |
| >>>>DL UP TNL Information | M | | UP Transport Layer Information 9.3.2.1 | gNB-DU endpoint of the F1 transport bearer. For delivery of DL PDUs. | — | |

TABLE 3

| (DRB/SRB Failed to Setup List IE) | | | | | |
|---|---|---|---|---|---|
| DRB Failed to Setup List | | 0 . . . 1 | | YES | ignore |
| >DRB Failed to Setup Item | | 1 . . . <maxnoofDRBs> | | EACH | ignore |
| >>DRB ID | M | | 9.3.1.8 | — | |
| >>Cause | O | | 9.3.1.2 | — | |
| SRB Failed to Setup List | | 0 . . . 1 | | YES | ignore |
| >SRB Failed to Setup Item | | 1 . . . <maxnoofSRBs> | | EACH | ignore |
| >>SRB ID | M | | 9.3.1.7 | — | |
| >>Cause | O | | 9.3.1.2 | — | |

TABLE 4

(DRB to be Modified List IE)

| | | | | | | |
|---|---|---|---|---|---|---|
| DRB to Be Modified List | | 0 . . . 1 | | | YES | reject |
| >DRB to Be Modified Item IEs | | 1 . . . <maxnoofDRBs> | | | EACH | reject |
| >>DRB ID | M | | 9.3.1.8 | — | | |
| >>CHOICE QoS Information | O | | | — | | |
| >>>E-UTRAN QoS | M | | 9.3.1.19 | Shall be used for EN-DC case to convey E-RAB Level QoS Parameters | — | |
| >>>DRB Information | | 1 | | Shall be used for NG-RAN cases | YES | ignore |
| >>>>DRB QoS | M | | 9.3.1.45 | | — | |
| >>>>S-NSSAI | M | | 9.3.1.38 | | — | |
| >>>>Notification Control | O | | 9.3.1.56 | | — | |
| >>>>Flows Mapped to DRB Item | | 1 . . . <maxnoofQoSFlows> | | | — | |
| >>>>>QoS Flow Identifier | M | | 9.3.1.63 | | — | |
| >>>>>QoS Flow Level QoS Parameters | M | | 9.3.1.45 | | — | |
| >> UL UP TNL Information to be setup List | | 0 . . . 1 | | | — | |
| >>> UL UP TNL Information to Be Setup Item IEs | | 1 . . . <maxnoofULUPTNLInformation> | | | — | |
| >>>>UL UP TNL Information | M | | UP Transport Layer Information 9.3.2.1 | gNB-CU endpoint of the F1 transport bearer. For delivery of UL PDUs. | — | |
| >>UL Configuration | O | | UL Configuration 9.3.1.31 | Information about UL usage in gNB-DU. | — | |
| >>DL PDCP SN length | O | | ENUMERATED(12 bits, 18 bits, . . .) | | YES | ignore |
| >>UL PDCP SN length | O | | ENUMERATED (12 bits, 18 bits, . . .) | | YES | ignore |
| >>Bearer Type Change | O | | ENUMERATED (true, . . .) | | YES | ignore |
| >> RLC Mode | O | | 9.3.1.27 | | YES | ignore |
| >>Duplication Activation | O | | 9.3.1.36 | Information on the initial state of CA based UL PDCP duplication | YES | reject |
| >> DC Based Duplication Configured | O | | ENUMERATED (true, . . . , false) | Indication on whether DC based PDCP duplication is configured or not. | YES | reject |

TABLE 4-continued (DRB to be Modified List IE)

| | | | | | |
|---|---|---|---|---|---|
| >>DC Based Duplication Activation | O | | 9.3.1.36 | Information on the initial state of DC based UL PDCP duplication | YES reject |

SUMMARY

It has been agreed in 3GPP that one or more backhaul (BH) RLC channels should be supported between the IAB node and its parent node (which could be another IAB node or a Donor DU). These backhaul RLC channels are on a high level similar to the access RLC channels that are used between the DU and the UE to realize the split CU/DU architecture. That is, one possible approach could be to reuse the existing DRBs to be Setup/Modified IEs in the F1 context management functions described above. There are some fundamental differences, however, as illustrated in the table below:

TABLE 5

| IE/Group Name | Presence | Range | Applicability for BH RLC channels |
|---|---|---|---|
| DRB to Be Setup List | | 0 . . . 1 | |
| >DRB to Be Setup Item IEs | | 1 . . . <maxnoofDRBs> | |
| >>DRB ID | M | | The CU needs a way to address BH RLC channels over F1 similar to DRB ID. |
| >>CHOICE QoS Information | M | | |
| >>>E-UTRAN QoS | M | | May be needed for IAB nodes connected via NSA in EUTRA-NR Dual connectivity (EN-DC) |
| >>>DRB Information | | 1 | |
| >>>>DRB QoS | M | | Could be used for BH RLC channels to indicate BH RLC channel QoS |
| >>>>S-NSSAI | M | | Could be used for BH RLC channels to indicate network slices to be used |
| >>>>Notification Control | O | | FFS if needed for BH RLC channels. |
| >>>>Flows Mapped to DRB Item | | 1 . . . <maxnoofQoSFlows> | FFS if this is needed for BH RLC channel since this is UE specific. |
| >>>>>QoS Flow Identifier | M | | |
| >>>>>QoS Flow Level QoS Parameters | M | | |
| >>>>>QoS Flow Mapping Indication | O | | |
| >>UL UP TNL Information to be setup List | | 1 | Not needed for BH RLC channel since they are not associated with GTP tunnels. FFS if some other TNL info will be signalled for mapping in the Donor DU. |
| >>>UL UP TNL Information to Be Setup Item IEs | | 1 . . . <maxnoofULUPTNLInformation> | |
| >>>>UL UP TNL Information | M | | |
| >> RLC Mode | M | | Could be used for BH RLC channels. |
| >>UL Configuration | O | | Most likely not needed for IAB nodes, since it is related to split bearers which may not be supported. |
| >>Duplication Activation | O | | Most likely not needed for IAB nodes, since it is related to split bearers which may not be supported. |
| >> DC Based Duplication Configured | O | | Most likely not needed for IAB nodes, since it is related to split bearers which may not be supported. |
| >>DC Based Duplication Activation | O | | Most likely not needed for IAB nodes, since it is related to split bearers which may not be supported. |
| >>DL PDCP SN length | M | | Could be used for BH RLC channels. |
| >>UL PDCP SN length | O | | Could be used for BH RLC channels. |

TABLE 5-continued

| IE/Group Name | Presence | Range | Applicability for BH RLC channels |
|---|---|---|---|
| DRB to Be Modified List | | 0 . . . 1 | |
| >DRB to Be Modified Item IEs | | 1 . . . <maxnoofDRBs> | |
| >>DRB ID | M | | The CU needs a way to address BH RLC channels over F1 similar to DRB ID. |
| >>CHOICE QoS Information | O | | |
| >>>E-UTRAN QoS | M | | May be needed for IAB nodes connected via NSA. |
| >>>DRB Information | | 1 | |
| >>>>DRB QoS | M | | Could be used for BH RLC channels. |
| >>>>S-NSSAI | M | | Could be used for BH RLC channels. |
| >>>>Notification Control | O | | FFS if needed for BH RLC channels. |
| >>>>Flows Mapped to DRB Item | | 1 . . . <maxnoofQoSFlows> | FFS if this is needed for BH RLC channel since this is UE specific. |
| >>>>>QoS Flow Identifier | M | | |
| >>>>>QoS Flow Level QoS Parameters | M | | |
| >> UL UP TNL Information to be setup List | | 0 . . . 1 | Not needed for BH RLC channel since they are not associated with GTP tunnels. FFS if some other TNL info will be signalled for mapping in the Donor DU. |
| >>> UL UP TNL Information to Be Setup Item IEs | | 1 . . . <maxnoofULUPTNInformation> | |
| >>>>UL UP TNL Information | M | | |
| >>UL Configuration | O | | Most likely not needed for IAB nodes, since it is related to split bearers which may not be supported. |
| >>DL PDCP SN length | O | | Could be used for BH RLC channels. |
| >>UL PDCP SN length | O | | Could be used for BH RLC channels. |
| >>Bearer Type Change | O | | Is used to reset lower layers which could also be used for BH RLC channels |
| >> RLC Mode | O | | Could be used for BH RLC channels. |
| >>Duplication Activation | O | | Most likely not needed for IAB nodes, since it is related to split bearers which may not be supported. |
| >> DC Based Duplication Configured | O | | Most likely not needed for IAB nodes, since it is related to split bearers which may not be supported. |
| >>DC Based Duplication Activation | O | | Most likely not needed for IAB nodes, since it is related to split bearers which may not be supported. |
| DRB to Be Released List | | 0 . . . 1 | |
| >DRB to Be Released Item IEs | | 1 . . . <maxnoofDRBs> | |
| >>DRB ID | M | | The CU needs a way to address BH RLC channels over F1 similar to DRB ID. |

As can be seen above, there are some fundamental differences between the information required to configure DRBs and the access RLC channels (note: the term "access RLC channel" is used to refer to the RLC channels between a UE and a DU or an IAB node serving a UE, while "BH RLC channel" refers to the RLC channel between an IAB node and its parent node, which could be another IAB node or a donor DU) between the DU and UE, and that required to configure backhaul RLC channels in IAB networks. Some IEs can be used without any ambiguity (e.g. RLC Mode), others are not relevant for BH RLC channels but mandatory for the DRBs/access RLC channels (e.g. tunnel information), and some can be reused but with some ambiguity (e.g. DRB ID, which can also be used to identify a BH RLC channels, but may cause confusion and some unforeseen problems in the specifications as BH RLC channels are not associated with DRBs). Additionally, there are some IEs that may be relevant for BH RLC channels, but they have size limitation to accommodate the configuration of the multitude of all these channels, especially if there is a 1:1 mapping between UE bearers and BH RLC channels in a multi-hop IAB network.

This disclosure introduces several mechanisms to configure BH RLC channels over the F1 interface between two IAB nodes, or between an IAB node and an IAB donor DU.

Below are some example embodiments.

1. New IEs (e.g. BH RLC Bearer to Be Setup, BH RLC Bearers to Be Modified, etc.) are introduced that contain the essential information relevant for configuring RLC channels to IAB nodes.

2. The current structure for configuring DRBs and associated access RLC channels are used (e.g. DRB to Setup, DRB to Modify, etc.), but with some enhancements, including: a) some reserved/default/configured values are used for the fields that are not relevant to IAB nodes and/or b) the value ranges of some fields are extended to accommodate the multitude of the BH RLC channels that could be configured, especially if there is a 1:1 mapping between UE bearers and the BH RLC channels that needs to be configured. The RLC bearer config IE is used for configuring BH RLC channels, but a separate BH RLC channel ID is introduced instead of the DRB ID (DRB-Identity) field.

In particular embodiment there is provided a method for establishing a BH RLC channel between a node (e.g., IAB node) and a DU (e.g. a donor DU).

In one aspect, the method includes a CU (e.g., a donor CU) detecting a need to establish the BH RLC channel between the node and the DU; and in response to detecting the need to establish the BH RLC channel, the CU sending to the DU an F1AP message (e.g., UE Context Setup Request or UE Context Modify Request message) requesting the DU to setup the BH RLC channel. The F1AP message comprises: i) a list identifying one or more BH RLC channels to be setup, wherein the list comprises at least one item containing a BH RLC Channel Identifier (ID) information element (IE) containing a BH RLC Channel ID identifying the BH RLC channel, or ii) a DRB ID IE containing the BH RLC Channel ID identifying the BH RLC channel.

In another aspect the method includes a DU receiving an F1AP message (e.g., UE Context Setup Request or UE Context Modify Request message) transmitted by a CU (e.g., a donor CU), wherein the F1AP message comprises: i) a list identifying one or more BH RLC channels to be setup, wherein the list comprises at least one item containing a BH RLC Channel Identifier (ID) information element (IE) containing a BH RLC Channel ID identifying the BH RLC channel, or ii) a DRB ID IE containing the BH RLC Channel ID identifying the BH RLC channel.

In some embodiments, the F1AP message comprises: the list identifying the one or more BH RLC channels to be setup, and the at least one item included in the list further contains QoS information associated with the BH RLC Channel ID. In some embodiments, the QoS information comprises an allocation and retention priority (ARP) value.

In some embodiments, the F1AP message comprises: the DRB ID IE containing the BH RLC Channel ID identifying the BH RLC channel, and the F1AP message further comprises an indication indicating that the DRB ID IE contains a BH RLC Channel ID instead of a DRB ID. In some embodiments, the F1AP message further comprises a DL PDCP SN length value, and the method further comprises the DU ignoring the DL PDCP SN length value.

In some embodiments, the method also includes the DU, in response to receiving an F1AP message, determining whether the DU is capable of establishing the BH RLC channel; and, as a result of determining that the DU is capable of establishing the BH RLC channel, the DU establishes a DU side of the BH RLC channel. In some embodiments, establishing the DU side of the BH RLC channel comprises allocating memory for an RLC buffer for the BH RLC channel and/or applying a BH RLC channel configuration indicated in the F1AP message.

An advantage of the embodiments disclosed herein is that they provide a mechanism to configure BH RLC channels to be used between an IAB node and its donor. Some of the embodiments enable current F1 application protocol (F1AP) messages and information elements used for DRB and access RLC channel configuration to be reused as much as possible, minimizing the specification impact. Other embodiments provide a cleaner and more forward compatible way of configuring the BH RLC channels, as even more differences may arise in the future 3GPP releases between DRBs/access RLC channels and BH RLC channels (e.g. if more features get added to IAB work in rel-17, having separate IEs controlling the configuration of BH RLC channels and DRBs/access RLC channels means that we need to modify only the IEs that are associated with BH RLC channels). This will simplify implementation and testing effort

BRIEF DESCRIPTION OF THE DRAWINGS

The accompanying drawings, which are incorporated herein and form part of the specification, illustrate various embodiments.

DETAILED DESCRIPTION

Figure 1:
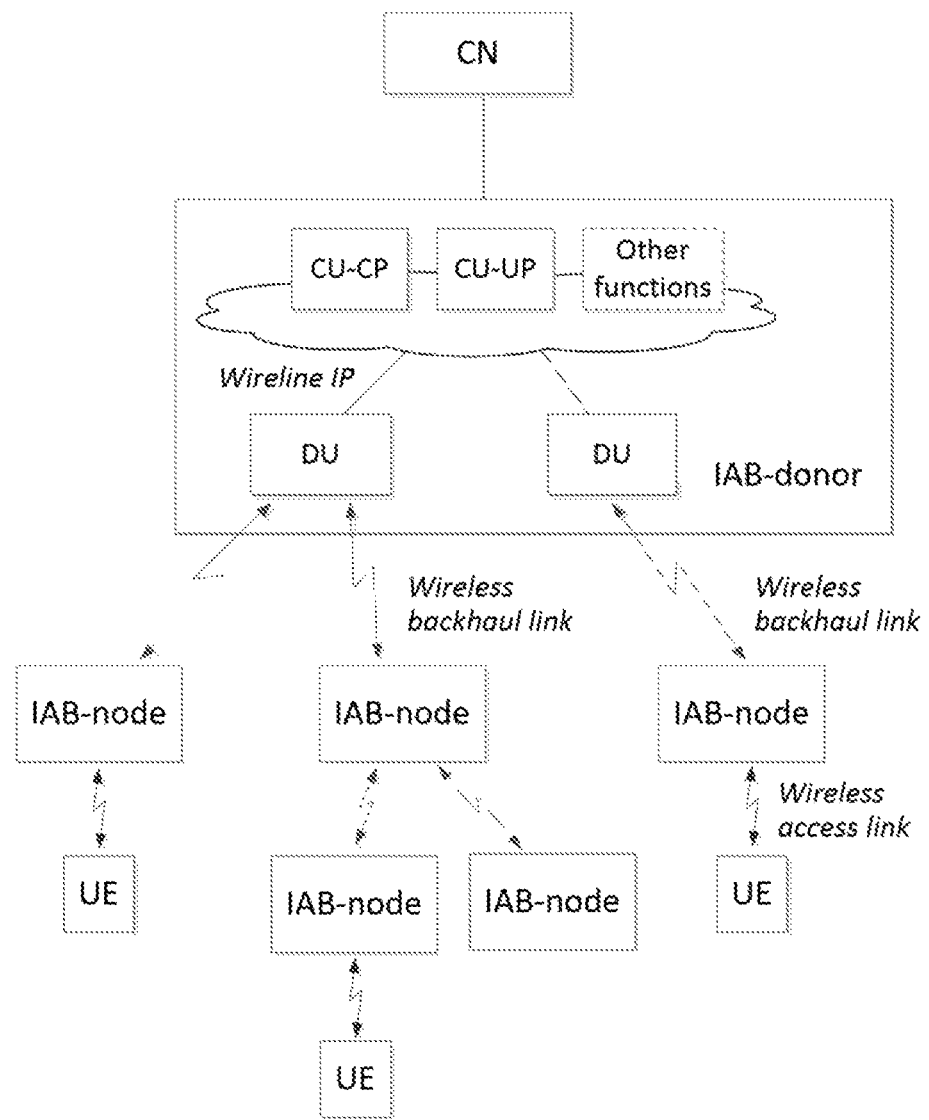
FIG. 1 shows a high level architectural view of an IAB network.
Figure 2:
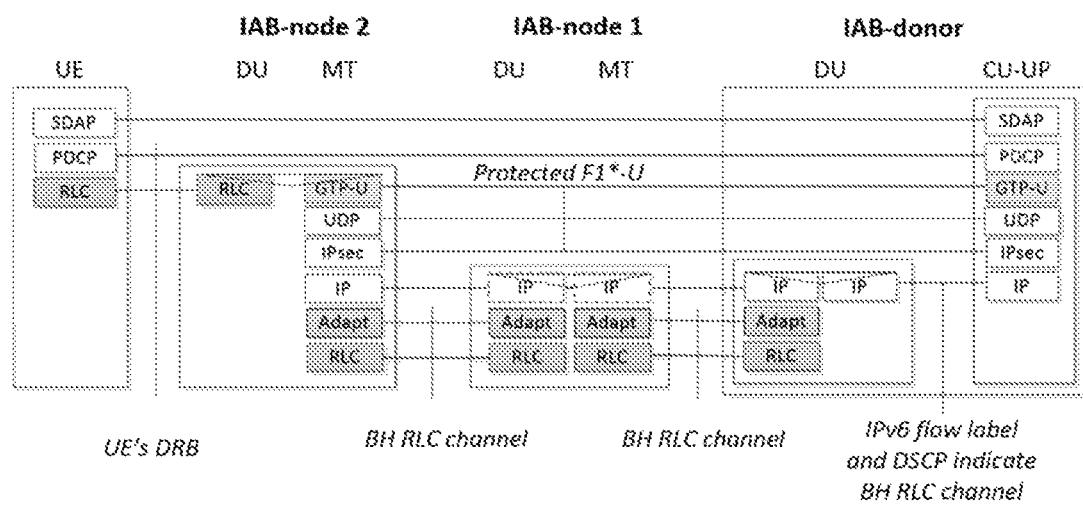
FIG. 2 shows user plane and control plane protocol stacks for IAB.
Figure 3:
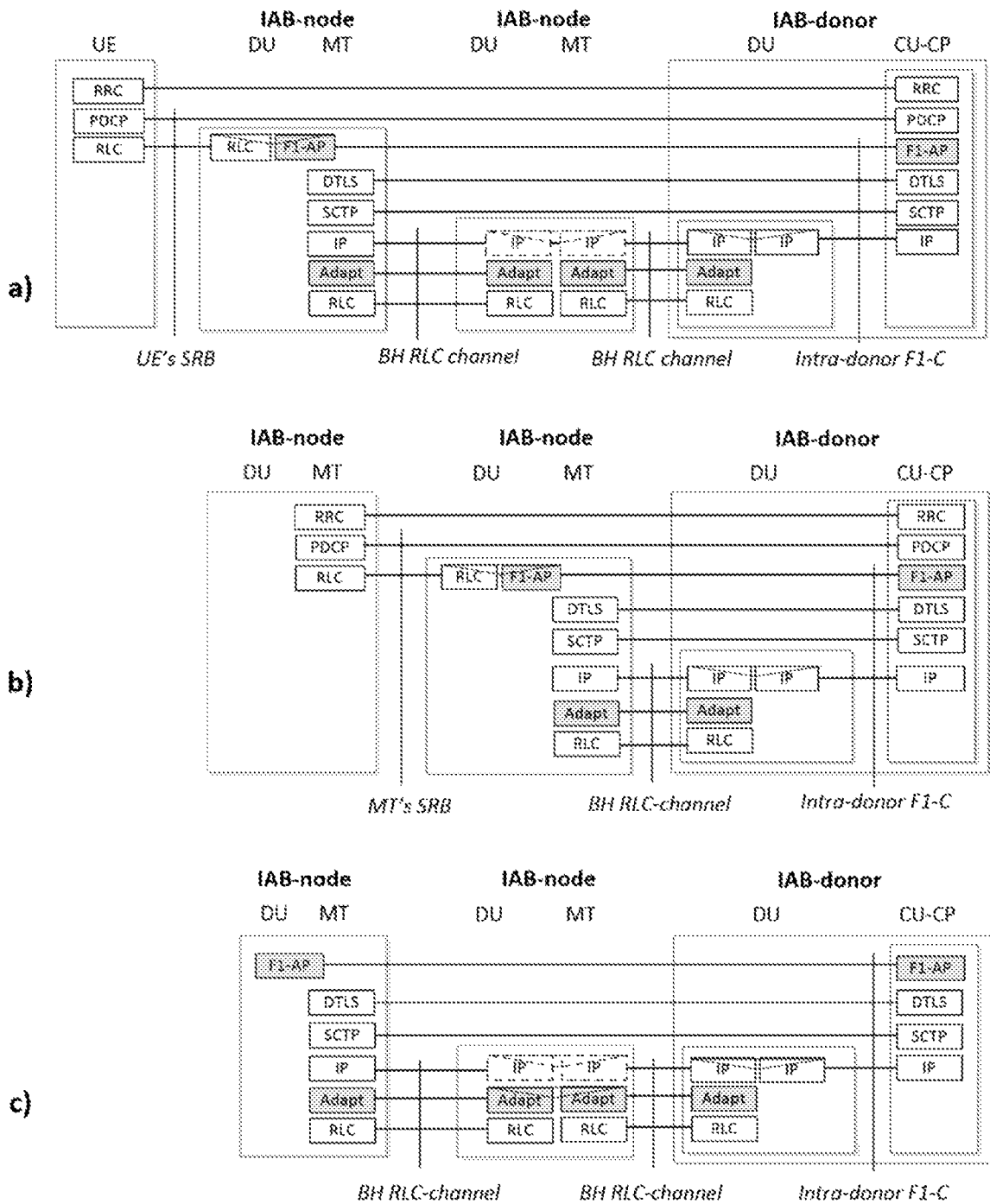
FIG. 3 shows user plane and control plane protocol stacks for IAB.

Introduced herein are mechanisms for identifying BH RLC channel in F1 signaling. The mechanisms make it possible for the donor IAB node or parent node (incl. DU and CU functionality) to signal to the IAB node to add/modify/remove BH RLC channels.

EXAMPLE USE CASES

1. A Donor CU decides it needs to establish a new BH RLC channel between the IAB node 1 and the Donor DU. The triggering for this could for instance be based on that a new IAB node 2 has connected to IAB node 1 or that a UE with a high priority or Guaranteed Bit Rate (GBR) service has connected to IAB node 1.

2. The Donor CU sends an F1AP message (e.g. a UE Context Setup (or Modify) Request message, an example of which is illustrated in section 9.2.2.1 of TS 38.473 V15.4.1) to Donor DU to establish a new BH RLC channel towards IAB node 1. The BH RLC channel is identified with an identifier, which will be used for later signaling for this BH RLC channel. The message will also include configuration information for the new BH RLC channel.

3. When the Donor DU receives the request to setup a BH RLC channel, the Donor DU determines if it is capable to fulfill the request. If it is, it will establish the DU side of the BH RLC channel, which could include allocating memory for the RLC buffer and other things. The Donor DU will also apply the BH RLC channel configuration received from the Donor CU.

4. The Donor DU acknowledges the BH RLC channel towards the Donor CU.

If the CU later decides to release the RLC BH channel the following steps will be followed:

1. The Donor CU decides it needs to release a BH RLC channel between the IAB node 1 and the Donor DU. The triggering for this could for instance be based on that a UE in the IAB node 1 which had an ongoing service using the BH RLC channel is no longer using this service requiring this BH RLC channel.

2. The Donor CU sends a F1AP message (e.g. a UE Context Modify Request message) to donor DU to release the BH RLC channel towards IAB node 1. The BH RLC channel is identified with the identifier which was assigned during the BH RLC channel setup.

3. When the Donor DU receives the request to release a BH RLC channel, the Donor DU performs the following release at the DU side of the BH RLC channel, which could include de-allocating memory for the RLC buffer and other things.

The embodiments described below show different solutions for how the BH RLC channel can be identified over F1, how it can be configured, and different solution how this can be signaling in the F1 message.

Embodiment 1

In one embodiment, new BH RLC channel configuration IEs are defined in FLAP that contain only essential information that are required to setup the BH RLC channels, as shown below:

| IE/Group Name | Range | Explanation/Benefits |
|---|---|---|
| BH RLC Channel to Be Setup List | 0 . . . 1 | |
| >BH RLC Channel to Be Setup Item IEs | 1 . . . <maxnoofBHRLCChannels> | A list containing all the backhaul RLC channels to be setup, where maxnoofBHRLCChannels refers to the maximum number of BH RLC channels that can be configured, the value of which needs to be agreed in 3GPP |
| >>BH RLC Channel ID | | An ID to address the BH RLC channel (e.g. during further modifications, BH RLC Channel setup success/failure responses, messages to release the BH RLC channels, etc.) |
| >>CHOICE QoS Information | | |
| >>>E-UTRAN QoS | | May be needed for IAB nodes connected via NSA. |
| >>QoS Information | 1 | |
| >>>BH RLC Channel QoS | | The QoS associated with the BH RLC channel. This could include parameters such as are currently configured in 9.3.1.45 QoS Flow Level QoS Parameters for DRBs (shown below) |
| >>>S-NSSAI | | The network slice associated with the BH RLC channel |
| >>>DRBs Mapped to BH RLC Channel Item | 1 . . . <maxnoofDRBs> | For N: 1 mapping, this can include the details of all the UE DRBs that are mapped over the BH RLC channels. This could be an option IE which could be used to enhance QoS granularity or handling. MAXnoofDRBs could be extended for BH RLC channels compared to existing DRBs. |
| >>>>DRB QoS | | The QoS level of bearers mapped to this BH RLC channels |
| >>>>number of DRBs | | The number of bearers of indicated QoS level that are mapped over this BH RLC channels |
| >> RLC Mode | | The RLC mode to be used for the BH RLC channel. |
| BH RLC Channel to Be Modified List | 0 . . . 1 | |
| >BH RLC Channel to Be Modified Item IEs | 1 . . . <maxnoofBHRLCChannels> | |
| >> BH RLC Channel ID | | |
| >>CHOICE QoS Information | | |
| >>>E-UTRAN QoS | | May be needed for IAB nodes connected via non stand alone NR (where LTE is used as a control connection) |
| >>>QoS Information | 1 | |
| >>>>BH RLC Channel QoS | | |
| >>>>S-NSSAI | | |
| >>>>DRBs Mapped to BH RLC Channel Item | 1 . . . <maxnoofDRBs> | For N: 1 mapping, this can include the details of all the UE DRBs that are mapped over the BH RLC channels. This could be an option IE which could be used to enhance QoS granularity or handling. MAXnoofDRBs could be extended for BH RLC channels compared to existing DRBs. |
| >>>>DRB QoS | | The QoS level of bearers mapped to this BH RLC channels |
| >>>>number of DRBs | | |
| >>Bearer Type Change | | Is used to reset lower layers which could also be used for BH RLC channels |
| >> RLC Mode | | |
| BH RLC channels to Be Released List | 0 . . . 1 | |
| >BH RLC channels to Be Released Item IEs | 1 . . . <maxnoofBHRLCChannels> | |
| >>BH RLC Channel ID | | |

In this embodiment several information elements (IEs) are included for configuring BH RLC channel over the F1 interface, including: 1) BH RLC channel IDs, 2) QoS information, 3) DRB information, and 4) Bearer type information. It should be understood that any combination of these IEs could be sent. Some of the IEs may be optionally configured while others may be mandatory. The QoS configuration of the BH RLC channel could be signaled as TS 38.473 V15.4.1 section 9.3.1.45 QoS Flow Level QoS Parameters below, which is shown below:

| IE/Group Name | Presence | Range | IE type and reference | Semantics description | Criticality | Assigned Criticality |
|---|---|---|---|---|---|---|
| CHOICE QoS Characteristics | M | | | | — | |
| >Non-dynamic 5QI | | | | | | |
| >>Non Dynamic 5QI Descriptor | M | | 9.3.1.49 | | — | |
| >Dynamic 5QI | | | | | — | |
| >>Dynamic 5QI Descriptor | M | | 9.3.1.47 | | — | |
| NG-RAN Allocation and Retention Priority | M | | 9.3.1.48 | | — | |
| GBR QoS Flow Information | O | | 9.3.1.46 | This IE shall be present for GBR QoS Flows only. | — | |
| Reflective QoS Attribute | O | | ENUMERATED (subject to, . . .) | Details in TS 23.501 [21]. This IE applies to non-GBR flows only and shall be ignored otherwise. | — | |
| PDU Session ID | O | | INTEGER (0 . . . 255) | As specified in TS 23.501 [21]. | YES | ignore |
| UL PDU Session Aggregate Maximum Bit Rate | O | | Bit Rate 9.3.1.22 | The PDU session Aggregate Maximum Bit Rate Uplink which is associated with the involved PDU session. | YES | ignore |

Embodiment 2

In one embodiment, the current IEs used for setting up of DRBs and access RLC channels are enhanced to support the configuration of BH RLC channels, as shown below. In this case no new structure is needed to be added for managing BH RLC channels only some new elements to the existing DRB structure.

| IE/Group Name | Presence | Range | Changes needed to support BH RLC channels |
|---|---|---|---|
| DRB to Be Setup List | | 0 . . . 1 | |
| >DRB to Be Setup Item IEs | | 1 . . . <maxnoofDRBs> | The maxnoofDRBs value is extended to support the total number of possible BH RLC channels, the value of which needs to be agreed in 3GPP |
| >>DRB ID | M | | The DRB ID will be used to identify a BH RLC Channel as well, even though there is no associated DRB. This will be used only in the communication between the CU and DU. In order to avoid confusion, values greater than 63, the current DRB ID limit can be assigned for BH RLC channel identification. Thus, the receiving node of a message containing this (CU/DU) will know the configuration is referring to a normal DRB/access RLC channel or a BH RLC channel. It is also possible to add a new IE for the BH RLC channels ID, or add an extension IE to the DRB ID. |
| >>CHOICE QoS Information | M | | |
| >>>E-UTRAN QoS | M | | This can be assigned to a default/reserved value, and ignored by the network, when the DRB to Be Setup Item IE is referring to a DRB ID associated with a BH RLC channel. |
| >>>DRB Information | | 1 | |
| >>>>DRB QoS | M | | This refers to the QoS of the BH RLC channel |
| >>>>S-NSSAI | M | | The network slice associated with the BH RLC channel |

| IE/Group Name | Presence | Range | Changes needed to support BH RLC channels |
|---|---|---|---|
| >>>>Notification Control | O | | Not included in case of setting up a BH RLC channel |
| >>>>Flows Mapped to DRB Item | | 1 . . . <maxnoofQoSFlows> | Since each UE bearer is mapped to a set of QoS flows, and a BH RLC channel can be mapped to several UE bearers (for N: 1 mapping), this can be used to aggregate all that information. In that case, the maxnoofQoSFlows limit may need extension to support N times the current maxnoofQoSFlows, where N is the maximum number of bearers that can be aggregated in one BH RLC channel |
| >>>>>QoS Flow Identifier | M | | |
| >>>>>QoS Flow Level QoS Parameters | M | | |
| >>>>>QoS Flow Mapping Indication | O | | |
| >>UL UP TNL Information to be setup List | | 1 | Not needed for BH RLC channel since they are not associated with GTP tunnels. Thus, a default/reserved value can be included in the UP TNL information below (or any value), as it will be ignored when referring to BH RLC channels |
| >>>UL UP TNL Information to Be Setup Item IEs | | 1 . . . <maxnoofULUPTNLInformation> | |
| >>>>UL UP TNL Information | M | | |
| >> RLC Mode | M | | The RLC mode of the BH RLC channel |
| >>UL Configuration | O | | Not included for BH RLC channels |
| >>Duplication Activation | O | | Not included for BH RLC channels |
| >> DC Based Duplication Configured | O | | Not included for BH RLC channels |
| >>DC Based Duplication Activation | O | | Not included for BH RLC channels supported. |
| >>DL PDCP SN length | M | | Set to some default value, ignored by the receiver of this message when referring to BH RLC channels |
| >>UL PDCP SN length | O | | Not included for BH RLC channels |
| DRB to Be Modified List | | 0 . . . 1 | |
| >DRB to Be Modified Item IEs | | 1 . . . <maxnoofDRBs> | |
| >>DRB ID | M | | |
| >>CHOICE QoS Information | O | | |
| >>>E-UTRAN QoS | M | | |
| >>>DRB Information | | 1 | |
| >>>>DRB QoS | M | | |
| >>>>S-NSSAI | M | | |
| >>>>Notification Control | O | | |
| >>>>Flows Mapped to DRB Item | | 1 . . . <maxnoofQoSFlows> | |
| >>>>>QoS Flow Identifier | M | | |
| >>>>>QoS Flow Level QoS Parameters | M | | |
| >> UL UP TNL Information to be setup List | | 0 . . . 1 | |
| >>> UL UP TNL Information to Be Setup Item IEs | | 1 . . . <maxnoofULUPTNLInformation> | |
| >>>>UL UP TNL Information | M | | |
| >>UL Configuration | O | | |
| >>DL PDCP SN length | O | | |
| >>UL PDCP SN length | O | | |
| >>Bearer Type Change | O | | Not included in case BH RLC channel |
| >> RLC Mode | O | | |
| >>Duplication Activation | O | | |
| >> DC Based Duplication Configured | O | | |
| >>DC Based Duplication Activation | O | | |
| DRB to Be Released List | | 0 . . . 1 | |
| >DRB to Be Released Item IEs | | 1 . . . <maxnoofDRBs> | |
| >>DRB ID | M | | |

In this embodiment, some values which are currently mandatory but are not useful for configuring BH RLC channels are set to default values (e.g. hardcoded in the standard) or just simply ignored by the DU function.

In this embodiment, the meaning of some IEs are changed in case the receive DU knows the IE is related to a BH RLC channel configurations. For example, the DRB ID field meaning could be change to BH RLC channel ID.

In order for the DU to know that a DRB configuration is in fact a BH RLC channel it would be possible to add a special indication in the F1 message that a particular DRB configuration is an BH RLC channel. The indication can be per DRB configuration, or per a set of DRB configurations.

Figure 4:
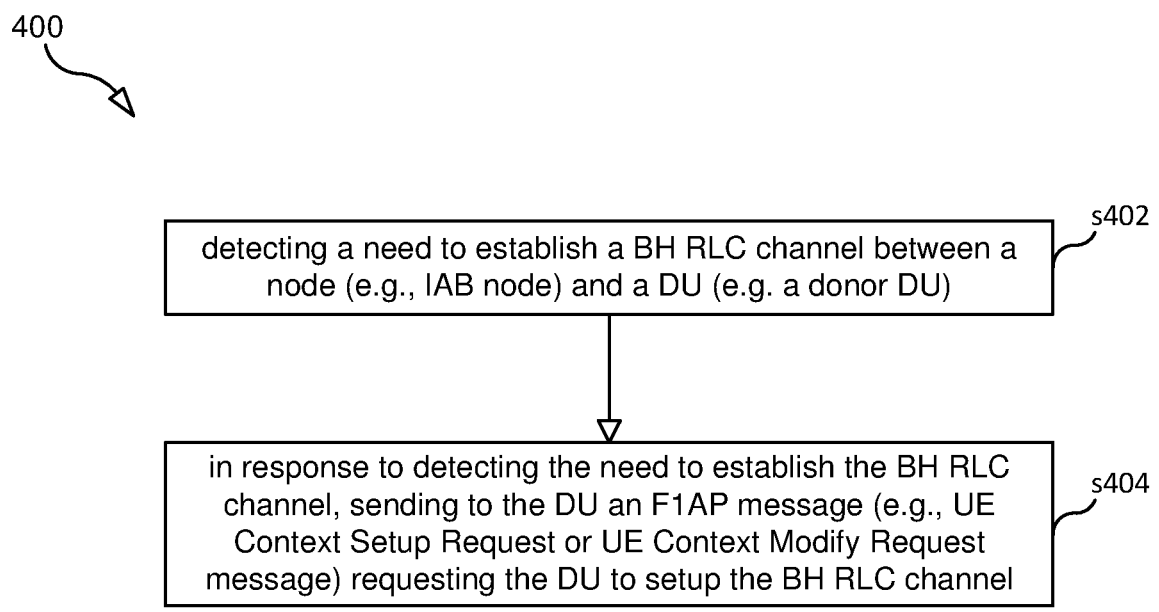
FIG. 4 is a flow chart illustrating a process according to some embodiments.

FIG. 4 is a flowchart illustrating a process 400 according to some embodiments. Process 400 may begin with step s402.

Step s402 comprises a CU (e.g., a donor CU) detecting a need to establish a BH RLC channel between a node (e.g., IAB node) and a DU (e.g. a donor DU).

Step s404 comprises the CU, in response to detecting the need to establish the BH RLC channel, sending an F1AP message (e.g., UE Context Setup Request or UE Context Modify Request message) to the DU. Advantageously, the F1AP message comprises: i) a list identifying one or more BH RLC channels to be setup, wherein the list comprises at least one item containing a BH RLC Channel Identifier (ID) information element (IE) containing a BH RLC Channel ID identifying the BH RLC channel, or ii) a DRB ID IE containing the BH RLC Channel ID identifying the BH RLC channel.

Figure 5:
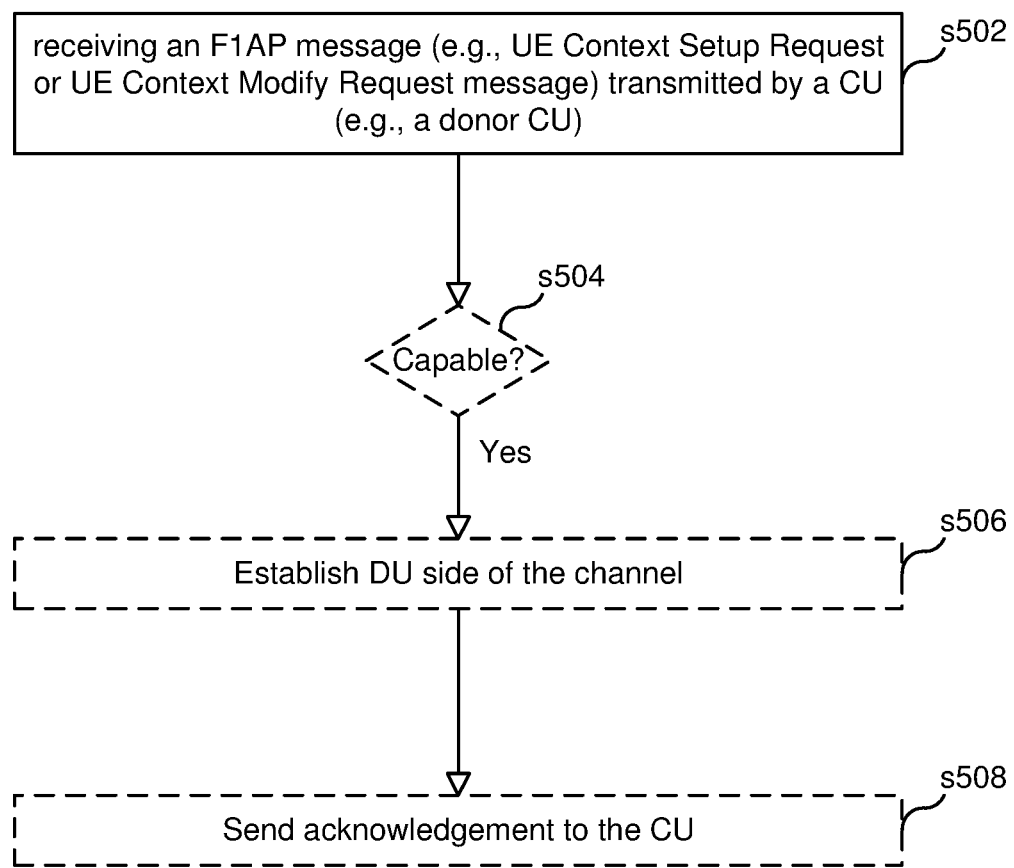
FIG. 5 is a flow chart illustrating a process according to some embodiments.

FIG. 5 is a flowchart illustrating a process 500 according to some embodiments. Process 500 may begin with step s502.

Step s502 comprises a donor DU receiving an F1AP message (e.g., UE Context Setup Request or UE Context Modify Request message) transmitted by a donor CU, the F1AP message requesting the DU to establish a BH RLC channel. Advantageously, the F1AP message comprises: i) a list identifying one or more BH RLC channels to be setup, wherein the list comprises at least one item containing a BH RLC Channel Identifier (ID) information element (IE) containing a BH RLC Channel ID identifying the BH RLC channel, or ii) a DRB ID IE containing the BH RLC Channel ID identifying the BH RLC channel.

Step s504 (optional) comprises the DU determining whether it is capable to establish the channel. If it is, the process may proceed to step s506.

Step s506 (optional) comprises the DU establishing a DU side of the channel.

Step s508 (optional) comprises the DU, after establishing a DU side of the channel, transmitting an acknowledgment to the CU indicating that the DU side of the channel has been established.

In some embodiments, establishing the DU side of the BH RLC channel comprises the DU allocating memory for an RLC buffer for the BH RLC channel and/or applying a BH RLC channel configuration indicated in the F1AP message.

Figure 6:
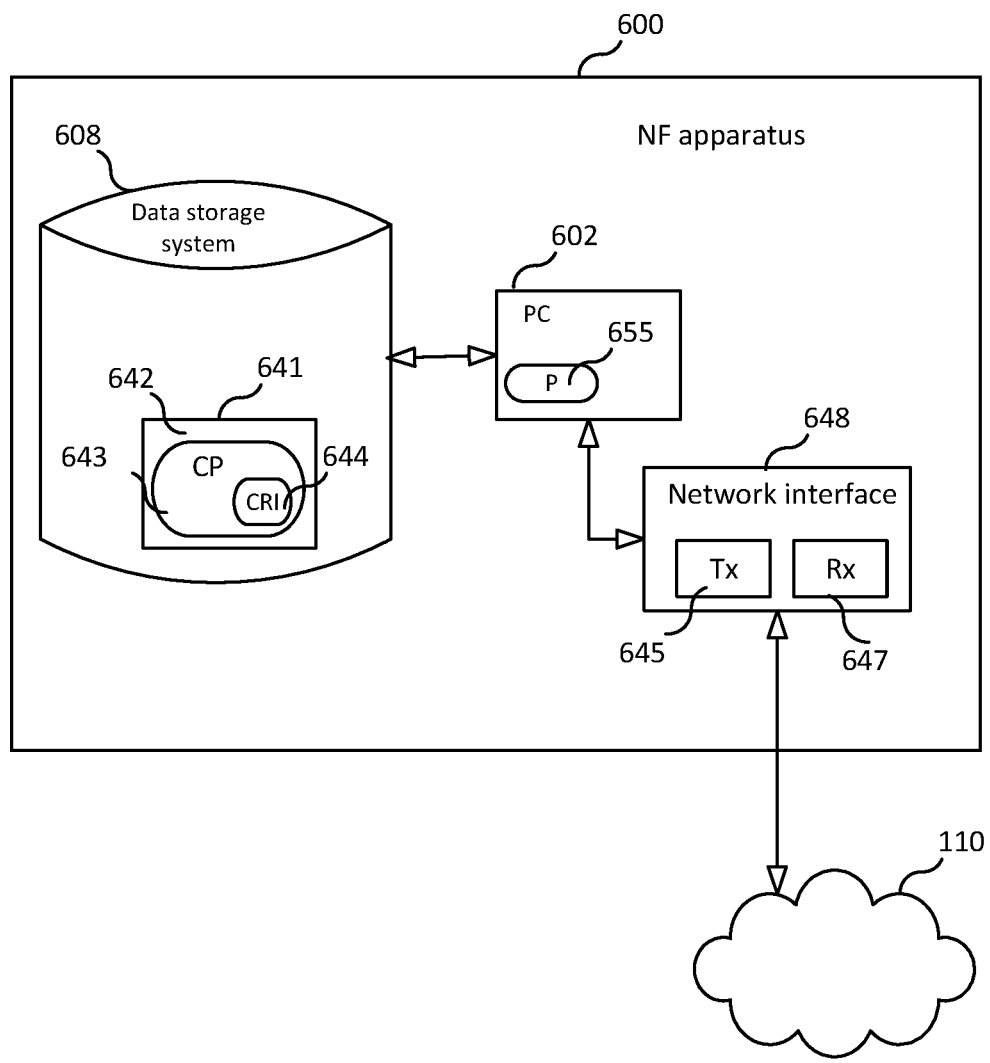
FIG. 6 is a block diagram illustrating an apparatus, according to an embodiment, for performing steps disclosed herein.

FIG. 6 is a block diagram of a network function (NF) apparatus 600, according to some embodiments. NF apparatus implements a CU or a DU. As shown in FIG. 6, NF apparatus 600 may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like), which processors 655 may be co-located in a single housing or in a single data center or may be geographically distributed (i.e., apparatus 600 may be a distributed apparatus); a network interface 648 comprising a transmitter (Tx) 645 and a receiver (Rx) 647 for enabling NF apparatus 600 to transmit data to and receive data from other nodes connected to network 110 (e.g., an Internet Protocol (IP) network) to which network interface 648 is connected; and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes NF apparatus 600 to perform steps described herein (e.g., steps described herein with reference to the flow charts). In other embodiments, NF apparatus 600 may be configured to perform steps described herein without the need for code. That is, for example, PC 602 may consist merely of one or more ASICs. Hence, the features of the embodiments described herein may be implemented in hardware and/or software.

Figure 7:
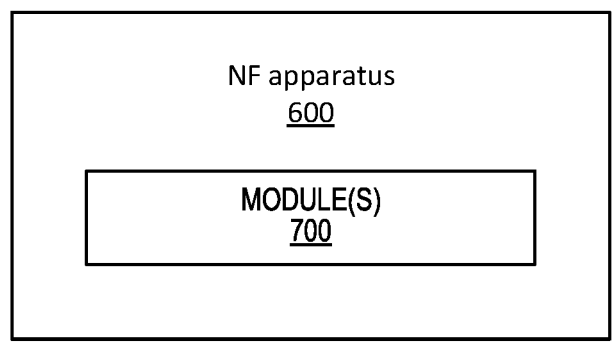
FIG. 7 is a block diagram illustrating an apparatus, according to an embodiment, for performing steps disclosed herein.

FIG. 7 is a schematic block diagram of the NF apparatus 600 according to some other embodiments. The NF apparatus 600 includes one or more modules 700, each of which is implemented in software. The module(s) 700 provide the functionality of NF apparatus 600 described herein and, in particular, the functionality of the CU or DU described herein (e.g., the steps herein, e.g., with respect to FIG. 4 and/or FIG. 5).

Summary of Various Embodiments

A1a. A method for establishing a BH RLC channel between a node (e.g., IAB node) and a DU (e.g. a donor DU), the method comprising: a CU (e.g., a donor CU) detecting a need to establish the BH RLC channel between the node and the DU; and in response to detecting the need to establish the BH RLC channel, the CU sending to the DU an F1AP message (e.g., UE Context Setup Request or UE Context Modify Request message) requesting the DU to setup the BH RLC channel, wherein the F1AP message comprises: i) a list identifying one or more BH RLC channels to be setup, wherein the list comprises at least one item containing a BH RLC Channel Identifier (ID) information element (IE) containing a BH RLC Channel ID identifying the BH RLC channel, or ii) a DRB ID IE containing the BH RLC Channel ID identifying the BH RLC channel.

A1b. A method for establishing a BH RLC channel between a node (e.g., IAB node) and a DU (e.g. a donor DU), the method comprising: the DU receiving an F1AP message (e.g., UE Context Setup Request or UE Context Modify Request message) transmitted by a CU (e.g., a donor CU), wherein the F1AP message comprises: i) a list identifying one or more BH RLC channels to be setup, wherein the list comprises at least one item containing a BH RLC Channel Identifier (ID) information element (IE) containing a BH RLC Channel ID identifying the BH RLC channel, or ii) a DRB ID IE containing the BH RLC Channel ID identifying the BH RLC channel.

A2. The method of embodiment A1a or A1b, wherein the F1AP message comprises: the list identifying the one or more BH RLC channels to be setup, and the at least one item included in the list further contains QoS information associated with the BH RLC Channel ID.

A3. The method of embodiment A2, wherein the QoS information comprises an allocation and retention priority (ARP) value.

A4. The method of embodiment A1a or A1b, wherein the F1AP message comprises: the DRB ID IE containing the BH RLC Channel ID identifying the BH RLC channel, and the F1AP message further comprises an indication indicating that the DRB ID IE contains a BH RLC Channel ID instead of a DRB ID.

A5. The method of embodiment A1b or A4, wherein the F1AP message further comprises a DL PDCP SN length value, and the method further comprises the DU ignoring the DL PDCP SN length value.

A6. The method of embodiment A1b, A4 or A5, further comprising: the DU, in response to receiving an F1AP message, determining whether the DU is capable of establishing the BH RLC channel; and as a result of determining that the DU is capable of establishing the BH RLC channel, the DU establishing a DU side of the BH RLC channel.

A7. The method of embodiment A6, wherein establishing the DU side of the BH RLC channel comprises allocating memory for an RLC buffer for the BH RLC channel and/or applying a BH RLC channel configuration indicated in the F1AP message.

B1. A computer program comprising instructions which when executed by processing circuitry of a network function apparatus (600) causes the apparatus to perform the method of any one of claims A1-A7.

B2. A carrier containing the computer program of embodiment B1, wherein the carrier is one of an electronic signal, an optical signal, a radio signal, and a computer readable storage medium.

C1. A network function, NF, apparatus (600), the NF apparatus (600) being adapted to: detect a need to establish a BH RLC channel; and in response to detecting the need to establish the BH RLC channel, send an F1AP message (e.g., UE Context Setup Request or UE Context Modify Request message) to a DU (e.g., a donor DU), wherein the F1AP message comprises: i) a list identifying one or more BH RLC channels to be setup, wherein the list comprises at least one item containing a BH RLC Channel Identifier (ID) information element (IE) containing a BH RLC Channel ID identifying the BH RLC channel, or ii) a DRB ID IE containing the BH RLC Channel ID identifying the BH RLC channel.

C2. A network function, NF, apparatus (600), the NF apparatus (600) comprising: a transmitter (645); and processing circuitry (602) adapted to: detect a need to establish a BH RLC channel; and in response to detecting the need to establish the BH RLC channel, employ the transmitter (645) to send an F1AP message (e.g., UE Context Setup Request or UE Context Modify Request message) to a DU (e.g., a donor DU), wherein the F1AP message comprises: i) a list identifying one or more BH RLC channels to be setup, wherein the list comprises at least one item containing a BH RLC Channel Identifier (ID) information element (IE) containing a BH RLC Channel ID identifying the BH RLC channel, or ii) a DRB ID IE containing the BH RLC Channel ID identifying the BH RLC channel.

D1. A network function, NF, apparatus (600), the NF apparatus (600) being adapted to: receive an F1AP message (e.g., UE Context Setup Request or UE Context Modify Request message) transmitted by a CU (e.g., a donor CU), wherein the F1AP message comprises: i) a list identifying one or more BH RLC channels to be setup, wherein the list comprises at least one item containing a BH RLC Channel Identifier (ID) information element (IE) containing a BH RLC Channel ID identifying the BH RLC channel, or ii) a DRB ID IE containing the BH RLC Channel ID identifying the BH RLC channel.

D2. A network function, NF, apparatus (600), the NF apparatus (600) comprising: a receiver (647) for receiving an F1AP message (e.g., UE Context Setup Request or UE Context Modify Request message) transmitted by a CU (e.g., a donor CU); and processing circuitry (602) for processing the received F1AP message, wherein the F1AP message comprises: i) a list identifying one or more BH RLC channels to be setup, wherein the list comprises at least one item containing a BH RLC Channel Identifier (ID) information element (IE) containing a BH RLC Channel ID identifying the BH RLC channel, or ii) a DRB ID IE containing the BH RLC Channel ID identifying the BH RLC channel.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for establishing a backhaul (BH) radio link control (RLC) channel between a node and a distributed unit (DU), the method comprising:
   a central unit (CU) detecting a need to establish the BH RLC channel between the node and the DU; and
   in response to detecting the need to establish the BH RLC channel, the CU sending to the DU an application protocol (AP) message requesting the DU to setup the BH RLC channel, wherein the AP message requesting the DU to setup the BH RLC channel comprises:
   a list identifying one or more BH RLC channels to be setup, wherein the list comprises at least one item containing a BH RLC channel identifier (ID) information element (IE) containing a BH RLC channel ID identifying one of the one or more BH RLC channels to be setup.

2. The method of claim 1, wherein the at least one item included in the list further contains quality-of-service (QoS) information associated with the BH RLC channel.

3. The method of claim 2, wherein the QoS information comprises an allocation and retention priority (ARP) value.

4. The method of claim 2, wherein the at least one item included in the list further contains RLC mode information identifying an RLC mode to be used for the BH RLC channel.

5. The method of claim 4, further comprising:
   the DU, in response to receiving the AP message, determining whether the DU is capable of establishing the BH RLC channel; and as a result of determining that the DU is capable of establishing the BH RLC channel, the DU establishing a DU side of the BH RLC channel.

6. The method of claim 1, wherein
the AP message further comprises a downlink (DL) Packet Data Convergence Protocol (PDCP) sequence number (SN) length value, and
the method further comprises the DU ignoring the DL PDCP SN length value.

7. The method of claim 1, further comprising:
the DU, in response to receiving the AP message, determining whether the DU is capable of establishing the BH RLC channel; and
as a result of determining that the DU is capable of establishing the BH RLC channel, the DU establishing a DU side of the BH RLC channel.

8. The method of claim 7, wherein establishing the DU side of the BH RLC channel comprises:
allocating memory for an RLC buffer for the BH RLC channel; and/or
applying a BH RLC channel configuration indicated in the AP message.

9. The method of claim 1, wherein the AP message is an F1 AP (F1AP) message.

10. The method of claim 9, wherein the F1AP message is a UE Context Setup Request or a UE Context Modify Request.

11. A method for establishing a backhaul (BH) radio link control (RLC) channel between a node and a distributed unit (DU), the method comprising:
the DU receiving an application protocol (AP) message transmitted by a central unit (CU), wherein the AP message comprises:
a list identifying one or more BH RLC channels to be setup, wherein the list comprises at least one item containing a BH RLC channel identifier (ID) information element (IE) containing a BH RLC channel ID identifying one of the one or more BH RLC channels to be setup.

12. The method of claim 11, wherein the at least one item included in the list further contains quality-of-service (QoS) information associated with the BH RLC channel.

13. The method of claim 12, wherein the QoS information comprises an allocation and retention priority (ARP) value.

14. The method of claim 12, wherein the at least one item included in the list further contains RLC mode information identifying an RLC mode to be used for the BH RLC channel.

15. The method of claim 11, wherein
the AP message further comprises a downlink (DL) Packet Data Convergence Protocol (PDCP) sequence number (SN) length value, and
the method further comprises the DU ignoring the DL PDCP SN length value.

16. The method of claim 11, further comprising:
the DU, in response to receiving an AP message, determining whether the DU is capable of establishing the BH RLC channel; and
as a result of determining that the DU is capable of establishing the BH RLC channel, the DU establishing a DU side of the BH RLC channel.

17. The method of claim 16, wherein establishing the DU side of the BH RLC channel comprises:
allocating memory for an RLC buffer for the BH RLC channel; and/or
applying a BH RLC channel configuration indicated in the AP message.

18. The method of claim 11, wherein the AP message is an F1 AP (F1AP) message.

19. The method of claim 18, wherein the F1AP message is a UE Context Setup Request or a UE Context Modify Request.

20. A network function (NF) apparatus, the NF apparatus being adapted to:
detect a need to establish a backhaul (BH) radio link control (RLC) channel; and
in response to detecting the need to establish the BH RLC channel, send an application protocol (AP) message to a distributed unit (DU), wherein the AP message comprises:
a list identifying one or more BH RLC channels to be setup, wherein the list comprises at least one item containing a BH RLC channel identifier (ID) information element (IE) containing a BH RLC channel ID identifying one of the one or more BH RLC channels to be setup.

21. The NF apparatus of claim 20, wherein the NF apparatus comprises a transmitter; and processing circuitry.

* * * * *